April 4, 1961  D. M. COWHER, SR  2,978,103
DEVICE FOR BENEFICIATING CONCRETE AGGREGATE
Filed April 16, 1959
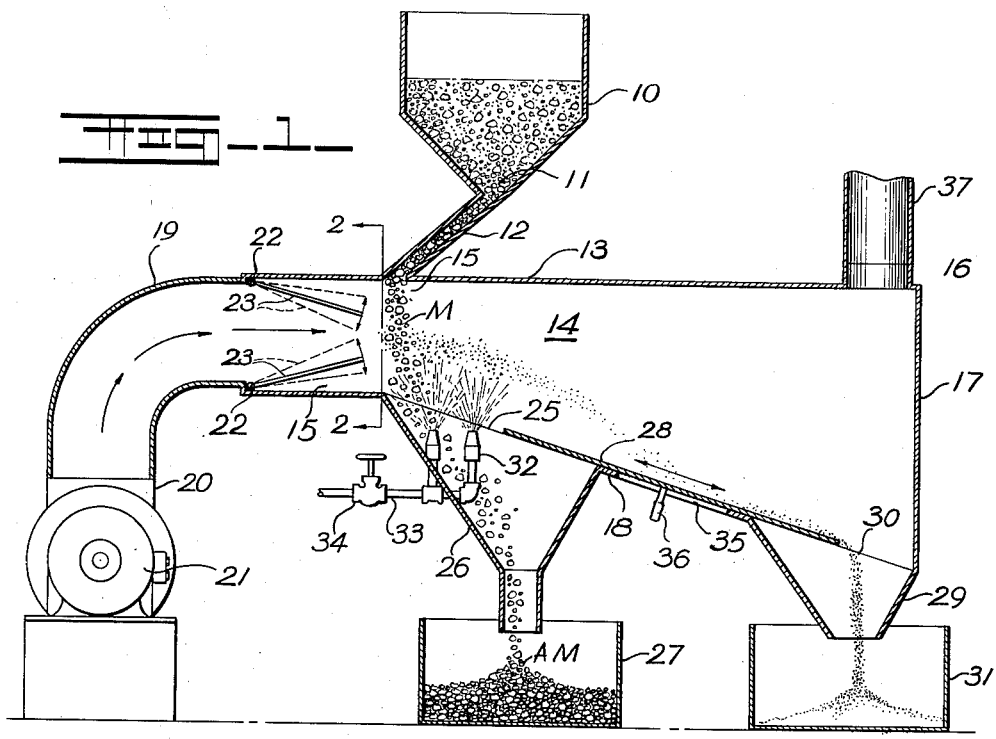
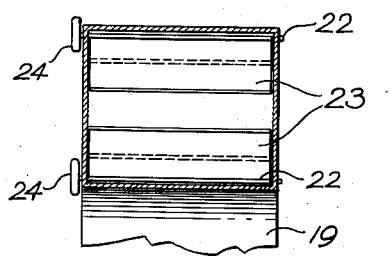
INVENTOR.
Daniel M. Cowher, Sr.
BY
W. B. Harpman
ATTORNEY.

United States Patent Office 2,978,103
Patented Apr. 4, 1961

2,978,103
DEVICE FOR BENEFICIATING CONCRETE AGGREGATE
Daniel M. Cowher, Sr., Box 14, West Pittsburgh, Pa.
Filed Apr. 16, 1959, Ser. No. 806,801
5 Claims. (Cl. 209—135)

This invention relates to a device for separating undesirable materials from concrete aggregates.

The principal object of the invention is the provision of a device for beneficiating concrete aggregate through the use of a combination of air and water spray.

A further object of the invention is the provision of a machine for beneficiating concrete aggregate by effectively removing material such as coal, lignite, shale, roots and flats and other undesirable material.

A still further object of the invention is the provision of a device for cleaning limestone and slag to remove the dust therefrom.

A still further object of the invention is the provision of a device for beneficiating bulk materials at low cost and in high volume.

A still further object of the invention is the provision of a device for beneficiating concrete aggregate and the like and including adjustment means making possible the selection of desirable sized particles.

The device for beneficiating concrete aggregates and cleaning limestone and slag as disclosed herein comprises an improvement in the art in that a combination of air by volume and water by forced spray are used to clean and separate the material being treated in a manner so that the lighter particles and the flats in the material are held and deflected by the water spray in the air column directed through the device thus separating the same from the clean sound heavier particles. Those skilled in the art will recognize that the choice of concrete aggregates is relatively wide and that in various areas, gravel, limestone and slag are commonly used and that in each instance it is necessary in the production of good concrete to be sure that the aggregate used is free from undesirable material. When gravel is used as an aggregate the presence of coal, lignite, shale, flats, roots and other similar material are undesirable for the reason that the inclusion of such materials in the concrete to be formed would result in an inferior concrete structure. The coal, lignite, shale and the flats tend to break up readily due to their generally laminated formation and thus cause broken spots in the concrete in which they may be used. Their lighter weight also causes them to float to the surface of the finished concrete. Dirt including soil, clay and foreign material including roots, pieces of tree bark and similar materials are also objectionable for substantially the same reasons. The present device effectively handles large quantities of gravel and separates the undesirable materials from the clean sound heavier particles which may then be successfully used in good concrete.

When limestone or slag are used as aggregates it is desirable that the limestone dust or slag dust be removed so that the aggregate remaining is clean and sound and capable of forming good concrete. The device disclosed herein effectively removes the dust from the limestone or the slag and retains the clean sound heavier particles as desired.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side elevation of the concrete aggregate beneficiating device with parts in cross section.

Figure 2 is a vertical section on line 2—2 of Figure 1.

By referring to the drawings and Figure 1 in particular it will be seen that the beneficiating device comprises a supply hopper 10 having an outlet 11 at its lowermost portion in communication with a vibrating screen conveyor or delivery chute 12 through which material to be beneficiated and placed in the supply hopper 10 will flow. The lower end of the chute 12 communicates with a cross sectionally rectangular housing 13 defining a cleaning chamber 14 having an end 15 thereof immediately below the chute 12 of lesser area than the opposite end 16 thereof. The housing 13 has a substantially horizontal top portion, a substantially vertical end wall 17 and an inclined bottom wall 18 extending between the ends 15 and 17. The end 15 of the housing 13 is open and communicates with a rectangular air supply duct 19 which in turn communicates with a volume blower 20 which is adapted to be driven by an electric motor 21. The smaller rectangular end portion 15 of the housing 13 has a pair of vertically spaced transversely positioned support rods 22 positioned there across the adjacent upper and lower surfaces thereof. Deflectors 23 are attached on their longitudinal edges to each of the rods 22 and the deflectors 23 are of a length slightly less than the transverse width of the end 15 of the housing 13. The deflectors 23 are arranged in oppositely disposed relation to one another and are of a width sufficient that they form deflecting surfaces of relatively great size with respect to air being delivered through the air duct 19 and which air must pass between the oppositely disposed deflectors 23.

Broken lines in Figure 1 indicate the alternate positions of the deflectors 23 whereby the air stream flowing therebetween may be substantially rectangular or may be shaped in a relatively wide thin column depending on the positioning of the deflectors 23. Control wheels incorporating means for retaining the same in desired position are provided on the outer ends of the rods 22 and indicated by the numerals 24 in Figure 2 of the drawings.

By adjusting these control wheels 24 the deflectors 23 may be positioned so that a relatively wide and high column of air is delivered at one extreme and a relatively wide thin column of air at the other extreme. The air thus delivered through the deflectors 23 engages aggregate material M falling from the chute 12 and tends to move the same along therewith. The lighter particles of the material that may be airborne are thus carried outwardly into the chamber 14 toward the end 17 of the housing 13 and deposited beyond an opening 25 in the sloping bottom wall 18 of the housing 13 and which opening 25 forms the top of a collecting chute 26. The bottom end of the collecting chute 26 is adapted to deliver the desirable clean, sound, heavier particles of the aggregate material AM into a bin 27 or on to a conveyor belt as will occur to those skilled in the art. The little particles including the coal, lignite, shale, roots, etc., are carried across by the air blast and fall on a movable panel 28 which is slidably positioned on the sloping bottom wall 18 of the housing 13 and partially overlies the opening 25. A secondary chute 29 is formed in the bottom wall 18 of the housing 13 with an opening 30 thereinto communicating with the chamber 14. The material separated from the aggregate enters the chute 29 and is deposited in a bin 31 or on to a conveyor belt as will be understood by those skilled in the art.

In order that the flats and larger pieces of coal, lignite, shale, etc., that may be deposited in the hopper 10 along with the aggregate material M will be carried across the opening 25 spray nozzles 32 connected to a water supply line 33 having a valve 34 therein are positioned in the uppermost portion of the chute 26 and directed upwardly and outwardly therefrom. Flats, for example, falling with the aggregate material M will be struck by the water sprays and turned thereby to insure the air stream delivering them on to the adjustable panel 28 and hence to the hopper 29.

When the device is used for washing limestone or slag, the water supply plus the air serves to clean the individual articles of the aggregate and insure the separation of the dust therefrom and its delivery to the chute 29. It will occur to those skilled in the art that by moving the adjustable panel 28 relative to the openings 25 and 30 the size of the heavier particles AM deposited in the chute 26 may be controlled. In order that this adjustment can be made a slot 35 is formed in the bottom wall 18 of the housing 13 and an arm 36 connected to the panel 28 is positioned therethrough.

The air delivered into the chamber 14 after effecting the beneficiation of the aggregate being treated escapes from the housing 13 by way of a vent stack 37. Those skilled in the art will observe that the amount of material rejected and thereby separated from the desired aggregate in the device is readily controlled by the adjustment of the sliding panel 28 relative to the sloping bottom wall 18 of the housing 13 and particularly with respect to the opening 25 communicating with the chute 26. The amount of rejection is also controllable by the volume of air and water introduced into the device so that regardless of the type of material being processed the desired result may be achieved.

It will thus be seen that a device for the beneficiation of aggregates in accordance with the objects of the invention has been disclosed and which device will operate efficiently at relatively low cost to achieve the several objects of the invention.

Having thus described my invention, what I claim is:

1. A device for beneficiating concrete aggregates comprising a housing having an air inlet opening in one end and an air vent adjacent its opposite end, means for introducing air into said housing through said air inlet opening in said end, deflectors in said end of said housing for directing the air so introduced, a delivery chute communicating with said housing adjacent said deflectors for delivering material to be beneficiated into said housing, a first opening in the bottom of said housing below said delivery chute, a second opening in the bottom of said housing spaced with respect to said first opening, a sliding panel forming a portion of the bottom of said housing and movable into and away from said openings, and water spray nozzles in said first mentioned opening in the bottom of said housing directed upwardly into said housing.

2. The device for beneficiating concrete aggregates set forth in claim 1 and wherein the delivery chute and the first mentioned opening in the bottom of the housing are in susbtantial vertical alignment and the water spray nozzles are in the line of travel of material entering the housing through said delivery chute.

3. The device for beneficiating concrete aggregates set forth in claim 1 and wherein the bottom of said housing is inclined from one end to the other, and wherein said air inlet opening is in the small end of said housing.

4. A device for beneficiating concrete aggregates and comprising a housing rectangular in cross section and one end of which is relatively larger than the other and wherein the bottom of said housing slopes from said larger end upwardly toward the smaller end, said sloping bottom having a pair of openings therein one of which is near the larger end of said housing and the other of which is near the smaller end of said housing, a panel slidably mounted on said bottom between said openings and partially covering the same, said panel arranged to simultaneously and progressively partially open one of said openings and partially close the other of said openings when moved chutes communicating with said openings and leading to separate points of disposal, an air inlet opening in said smaller end of said housing, a vent opening in said larger end of said housing a material delivery opening in the top of said housing adjacent the smaller end thereof, an air duct communicating with the opening in the smaller end of said housing, means for supplying air to said air duct, and upwardly directed water spray nozzles positioned in said opening adjacent the smaller end of said housing and below the material delivery opening in said housing.

5. The device for beneficiating concrete aggregates as set forth in claim 5 and wherein an arm is formed on said panel and positioned in a slot in bottom of said housing and extends outwardly therefrom to provide means for moving said panel.

References Cited in the file of this patent

UNITED STATES PATENTS

| | | |
|---|---|---|
| 443,901 | Craig | Dec. 30, 1890 |
| 1,135,754 | Bell | Apr. 13, 1915 |
| 1,420,593 | Titchmarsh | June 20, 1922 |
| 1,759,595 | Stebbins | May 27, 1930 |

FOREIGN PATENTS

| | | |
|---|---|---|
| 325,184 | Switzerland | Dec. 14, 1957 |